United States Patent [19]

Matsushita

[11] Patent Number: 5,225,117
[45] Date of Patent: Jul. 6, 1993

[54] PROCESS FOR PRODUCING PVA MICROCAPSULES

[75] Inventor: Toshihiko Matsushita, Tokyo, Japan

[73] Assignee: Mitsubishi Paper Mills Limited, Tokyo, Japan

[21] Appl. No.: 550,451

[22] Filed: Jul. 10, 1990

[30] Foreign Application Priority Data

Sep. 28, 1989 [JP] Japan .................. 1-253893

[51] Int. Cl.$^5$ .................. B01J 13/14; B01J 13/20
[52] U.S. Cl. .................. 264/4.33; 264/4.6; 264/4.3; 427/213.33; 427/213.36
[58] Field of Search .................. 264/4.1, 4.3, 4.6; 427/213.33, 213.36

[56] References Cited

U.S. PATENT DOCUMENTS

| | | | |
|---|---|---|---|
| 3,201,353 | 8/1965 | Corben | 428/402.2 |
| 3,565,818 | 2/1971 | Bayless et al. | 264/4.3 X |
| 3,574,133 | 4/1971 | Bayless et al. | 264/4.3 X |
| 3,576,758 | 4/1971 | Emrick | 264/4.3 X |
| 3,582,495 | 6/1971 | Emrick | 264/4.3 X |
| 4,244,836 | 1/1981 | Frensch et al. | 428/402.22 X |
| 4,269,729 | 5/1981 | Maruyama et al. | 427/213.33 X |
| 4,898,781 | 2/1990 | Onouchi et al. | 428/402.22 |

FOREIGN PATENT DOCUMENTS 55-15681 2/1980 Japan .
56-100630 8/1981 Japan .
63-252543 10/1988 Japan .

*Primary Examiner*—Robert L. Stoll
*Assistant Examiner*—John M. Covert
*Attorney, Agent, or Firm*—Cushman, Darby & Cushman

[57] ABSTRACT

Microcapsules which comprise, (A) a wall comprising a mixture of zirconium chloride and at least one member selected from the group consisting of poly(vinyl alcohol) and its derivatives, and (B) a core material enclosed with the wall; and a process for producing the same. In this invention, any substance can be used as the core material irrespective of its hydrophicity or hydrophobicity, and there can be obtained microcapsules excellent in heat resistance, water resistance, and transparency by simple steps.

6 Claims, No Drawings

PROCESS FOR PRODUCING PVA MICROCAPSULES

BACKGROUND OF THE INVENTION

This invention relates to microcapsules and a process for producing the same. More particularly, this invention relates to microcapsules comprising poly(vinyl alcohol) (hereinafter referred to as "PVA") as a wall and a process for producing the same.

Recently, arts using microcapsules have improved remarkably. As a representative of the field of utilization thereof, pressure-sensitive manifold papers can be mentioned. Moreover, microcapsules are also used in a wide variety of fields such as toners for electrophotography, binders, medicines, cosmetics, agricultural chemicals, liquid crystals, perfumes, or the like.

As a process for producing microcapsules, the following may be mentioned along with documents concerning the same.

(1) Physicochemical Processes

Complex coacervation method
U.S. Pat. Nos. 2,730,456 and 2,730,457, etc.
Curing-in-liquid method
J.P. Pat. Appln. Kokoku No. S. 48-16183
J.P. Pat. Appln. Kokai No. S. 52-117282, etc.

(2) Chemical Processes

Interfacial polymerization method
J.P. Pat. Appln. Kokoku Nos. S. 42-446,
S. 42-11344, S. 45-20885 and S. 49-34302, etc.
In situ polymerization method
J.P. Pat. Appln. Kokoku Nos. S. 44-1379,
S. 46-30282, S. 54-16949, S. 58-558121 and
S. 59-35258, etc.

(3) A Process Using a Machine

Spray-drying method
J.P. Pat. Appln. Kokai Nos. S. 56-64349 and
S. 59-162943, etc.

In some of the above methods, PVA type polymers are used as a wall. For example, liquid-liquid phase separation methods (coacervation methods) disclosed in J.P. Pat. Appln. Kokai Nos. S. 55-15681 and 56-100630 may be mentioned. J.P. Pat. Appln. Kokai No. S. 55-15681 discloses a method comprising the following steps: dispersing a substantially water-insoluble core material in an aqueous solution of a PVA type polymer having a cloud point, making the concentrated aqueous solution of the PVA type polymer into a separated phase around the core material by raising the temperature of the whole system to more than the cloud point of the PVA type polymer, forming a microcapsule wall of the PVA type polymer enclosing the core material and swelling with water, and curing the microcapsule wall. Furthermore, J.P. Pat. Appln. Kokai No. S. 56-100630 discloses that an acid and a dialdehyde compound are used as components of a curing agent in the method disclosed in J.P. Pat. Appln. Kokai No. S. 55-15681. Both of these methods utilize a phenomenon that an aqueous solution of a PVA type polymer as such causes liquid-liquid separation at temperatures higher than the cloud point of the aqueous solution. Thus, in the methods of producing microcapsules described above are troublesome because the temperature of the solution must be raised to more than the cloud point and a curing agent is necessary for curing of the wall.

On the other hand, J.P. Pat. Appln. Kokai No. S. 63-252543 discloses a process for producing water-soluble microcapsules in which a hydrous hydrophilic material is enclosed with PVA or modified PVA. In this process, the water-soluble microcapsules are obtained by the curing-in-liquid method or the spray-drying method. The wall is formed using a cross-linking agent such as bromic acid or the like; however, the microcapsule wall formed can be dissolved in water. Therefore, the wall is not insolubilized but dissolved in water in this method.

SUMMARY OF THE INVENTION

It is an object of this invention to provide microcapsules comprising PVA as a wall.

It is another object of this invention to provide a process for producing said microcapsules.

According to this invention, there are provided microcapsules which comprise, (A) a wall material comprising a mixture of zirconium chloride and at least one member selected from the group consisting of poly(vinyl alcohol) and its derivatives; and (B) a core material enclosed with the wall.

According to this invention, there is further provided a process for producing microcapsules, comprising:

emulsifying a core material in an aqueous solution of a mixture of zirconium chloride and at least one member selected from the group consisting of poly(vinyl alcohol) and its derivatives; and subjecting the emulsion to spray-drying in an alkaline atmosphere, or adding the emulsion dropwise to an alkaline aqueous solution.

According to this invention, there is further provided a process for producing microcapsules, comprising:

dispersing a core material in an aqueous solution of a mixture of zirconium chloride and at least one member selected from the group consisting of poly(vinyl alcohol) and its derivatives; and subjecting the dispersion to spray-drying in an alkaline atmosphere, or adding the dispersion dropwise to an alkaline aqueous solution.

According to this invention, there is still further provided a process for producing microcapsules using an orifice method, comprising:

filling a core material into the inner side of a double concentric nozzle and filling an aqueous solution of a mixture of zirconium chloride and at least one member selected from the group consisting of poly(vinyl alcohol) and its derivatives into the outer side of the double concentric nozzle, and spraying the core material and aqueous solution simultaneously into an alkaline atmosphere and then drying it, or adding the core material and aqueous solution dropwise to an alkaline solution.

DETAILED DESCRIPTION OF THE INVENTION

First, the microcapsules of this invention is described in detail below.

The microcapsules of this invention comprise PVA and/or its derivative as a wall. The microcapsules are produced by enclosing a core material with a water-soluble mixture of zirconium chloride, PVA and/or its derivative, and then subjecting it to an alkali treatment. The resulting wall of PVA has been insolubilized and has heat resistance, water resistance and transparency.

Therefore, the microcapsules obtained in this invention have excellent properties required of microcapsules.

The insolubilization of PVA depends upon the presence of zirconium ion. Zirconium has a maximum coordination number of 8 and is very reactive. It is well known that zirconium ion reacts with a functional group such as a hydroxy group, carboxy group or amine group to form a chelate compound, and the resulting chelate compound can be made into an inert substance by heat treatment. When PVA and zirconium chloride is mixed, zirconium ion reacts with the hydrophilic group of PVA to form an inert complex. Subsequently, the resulting complex is treated with an alkali, and then dried so that zirconium acts as a cross-linking agent between PVA molecules to form a cross-linked structure. Furthermore, it is thought that zirconium ion binds to a carbon atom of PVA by way of an oxygen atom to insolubilize PVA. Thus, PVA is endowed with heat resistance, water resistance, and transparency.

In this invention, the core material enclosed with the wall is at least one member selected from the group consisting of water, a hydrophilic substance, an aqueous solution of a hydrophilic substance, a hydrophobic substance, and a nonaqueous solution of a hydrophobic substance. Specifically, there may be mentioned dyes, pigments, water, organic solvents, medicines, foods, perfumes, agricultural chemicals, binders, enzymes and the like. A suitable process for producing microcapsules can be selected depending upon the kind of the core material. When the core material is a hydrophilic substance or an aqueous solution of a hydrophilic substance, the process of this invention is especially effective in view of simpleness of the steps thereof.

PVA and its derivatives used in this invention include completely saponified PVA, partially saponified PVA, anion-modified PVA and the like.

Zirconium chloride used in this invention includes water-soluble chlorides of zirconium such as zirconium tetrachloride ($ZrCl_4$), zirconyl chloride ($ZrOCl_2$), basic zirconyl chloride ($ZrOOHCl$) and the like.

The alkali used in this invention includes sodium hydroxide, ammonium hydroxide, sodium carbonate, ammonium carbonate, sodium borate, ammonium borate, sodium silicate, ammonium chloride, and the like.

In this invention, the water-soluble mixture contains zirconium chloride, PVA and/or its derivative. The amount of zirconium chloride is, preferably 0.05–35 parts by weight, more preferably 0.5–20 parts by weight in terms of $ZrO_2$ every 100 parts by weight of PVA. Less than 0.05 part by weight, sufficient effects cannot be obtained. More than 35 parts by weight, the wall is opacified by the alkali treatment and becomes weak.

Next, the process of this invention is described in detail below.

(1) Curing-in-Liquid Method

A core material is emulsified or dispersed in an aqueous solution of zirconium chloride, PVA and/or its derivative. The resulting emulsion or dispersion is sprayed from a nozzle into an alkaline aqueous solution according to an orifice method to cure the all of PVA so that objective microcapsules are obtained.

(2) Spray-Drying Method

A core material is emulsified or dispersed in an aqueous solution of zirconium chloride, PVA and/or its derivative. The resulting emulsion or dispersion is sprayed into an alkaline atmosphere in a drying chamber using a spray dryer (spray-dry granulator) to cure and dry the wall of PVA so that objective microcapsules are obtained.

Besides these methods, various known methods may be used for producing the microcapsules of this invention.

As described above, the insolubilization of the wall of PVA is effected by subjecting the solution of PVA and zirconium chloride to the alkaline atmosphere. The reason for the insolubilization of PVA is supposed to be as follows: When zirconium chloride is mixed with PVA, zirconium ion reacts with the hydrophilic group of PVA to form an inert complex. Moreover, when the resulting complex is subjected to an alkali treatment followed by drying, zirconium acts as a cross-linking agent between PVA molecules to form a cross-linked structure. Furthermore, zirconium ion binds to a carbon atom of PVA by way of an oxygen atom to insolubilized PVA. Thus, PVA is endowed with heat resistance, water resistance, and transparency.

For the above reasons, the microcapsules and the process of this invention have advantages, which cannot be obtained by conventional arts.

DESCRIPTION OF THE PREFERRED EMBODIMENTS

The following Examples further illustrate this invention.

EXAMPLE 1

100 Parts by weight of PVA having a polymerization degree of 2,000 and a saponification degree of 95 mol % and 10 parts by weight of zirconium chloride ($ZrOCl_2$) in terms of $ZrO_2$ were added to 890 parts by weight of water. The resulting mixture was stirred and heated to obtain a uniform solution (hereinafter referred to as "solution A").

Apart from the above, 30 parts by weight of 3-diethylamino-6-methyl-7-phenylaminofluoran, which is an electron-donating compound was dissolved in 470 parts by weight of phenylxylylethane to obtain a uniform solution (hereinafter referred to as "solution B").

To the solution A was added 5 parts by weight of an emulsifier (HLB: 13.3) composed of polyoxyethylenesorbithane monolaurate and the solution B. The resulting mixture was stirred to obtain an emulsion. The resulting emulsion was sprayed into an ammonia gas atmosphere in a drying chamber and then dried using a spray dryer (ANHYDRO spray dryer). The dried composition was put into a basket using a cyclone to obtain microcapsules in the form of particles. The microcapsules thus obtained had an average diameter of 8 $\mu$m. The microcapsules were put on a sheet of lower paper for pressure-sensitive manifold paper and then pressure was applied thereto. As a result, black coloring was observed.

EXAMPLE 2

The emulsion obtained in Example 1 was added dropwise to 10% aqueous ammonia solution using a fine nozzle with stirring. As a result, microcapsules in the form of particles were obtained in the aqueous ammonia solution.

EXAMPLE 3

100 Parts by weight of PVA having a polymerization degree of 500 and a saponification degree of 80 mol % and 1 part by weight of zirconium chloride were added to 899 parts by weight of water. The resulting mixture was stirred to obtain a uniform solution (hereinafter referred to as "solution C").

Apart from the above, a 10% aqueous solution of tannic acid was prepared (hereinafter referred to as "solution D").

Solution C was filled into the outer side of a double concentric nozzle while solution D was filled into the inner side thereof. And then, these solutions were sprayed into an ammonia gas atmosphere in the same way as in Example 1 to obtain microcapsules enclosing the aqueous solution of tannic acid. The microcapsules thus obtained and powder of ammonium metavanadate were mixed and then pressure was applied to thereto. As a result, black coloring due to a chelate reaction was observed.

As is clear from the above description, the microcapsules and the process of this invention have practical and industrial advantages as follows: The wall of insolubilized PVA can be formed by spraying or adding dropwise a mixture of PVA and zirconium chloride into an alkaline atmosphere. Any substance can be used as the core material enclosed therewith, irrespective of its hydrophilicity or hydrophobicity. The microcapsules can be produced by simple steps according to the process of this invention.

What is claimed is:

1. A process for producing microcapsules, comprising:
    emulsifying a core material in an aqueous solution of a mixture of zirconium chloride and at least one member selected from the group consisting of poly(vinyl alcohol), completely saponified poly(vinyl alcohol), partially saponified poly(vinyl alcohol) and anionic poly(vinyl alcohol); and
    subjecting the emulsion to spray-drying in an alkaline atmosphere, or adding the emulsion dropwise to an alkaline aqueous solution.

2. A process according to claim 1, wherein the core material is at least one member selected from the group consisting of water, a hydrophilic substance, an aqueous solution of a hydrophilic substance, a hydrophobic substance, and a nonaqueous solution of a hydrophobic substance.

3. A process for producing microcapsules, comprising:
    dispersing a core material in an aqueous solution of a mixture of zirconium chloride and at least one member selected from the group consisting of poly(vinyl alcohol), completely saponified poly(vinyl alcohol), partially saponified poly(vinyl alcohol) and anionic poly(vinyl alcohol); and
    subjecting the dispersion to spray-drying in an alkaline atmosphere, or adding the dispersion dropwise to an alkaline aqueous solution.

4. A process according to claim 3, wherein the core material is at least one member selected from the group consisting of water, a hydrophilic substance, an aqueous solution of a hydrophilic substance, a hydrophobic substance, and a nonaqueous solution of a hydrophobic substance.

5. A process for producing microcapsules using an orifice method, comprising:
    filling a core material into inner side of a double concentric nozzle, and filling and aqueous solution of a mixture of zirconium chloride and at least one member selected from the group consisting of poly(vinyl alcohol), completely saponified poly(vinyl alcohol), partially saponified poly(vinyl alcohol) and anionic poly(vinyl alcohol) into outer side of the double concentric nozzle; and
    spraying the core material and the aqueous solution simultaneously into an alkaline atmosphere and then drying it, or adding the core material and the aqueous solution dropwise into an alkaline aqueous solution.

6. A process according to claim 5, wherein the core material is at least one member selected from the group consisting of water, a hydrophilic substance, an aqueous solution of a hydrophilic substance, a hydrophobic substance, and nonaqueous solution of a hydrophobic substance.

* * * * *